Jan. 25, 1966 — V. L. PEICKII ETAL — 3,231,284

FACE SEALS

Filed Jan. 15, 1962 — 5 Sheets-Sheet 1

Jan. 25, 1966　　　V. L. PEICKII ETAL　　　3,231,284
FACE SEALS

Filed Jan. 15, 1962　　　　　　　　　　　　　　　5 Sheets-Sheet 3

3,231,284
FACE SEALS
Vasilie L. Peickii, Hillsborough, and Joseph E. Lepetich, Los Altos, Calif., assignors to Federal-Mogul Corporation, Detroit, Mich., a corporation of Michigan
Filed Jan. 15, 1962, Ser. No. 168,007
13 Claims. (Cl. 277—38)

This application is a continuation-in-part of application Serial Number 805,114, filed March 30, 1959, and now abandoned, which was a division of application Serial Number 736,100, filed May 19, 1958, now Patent Number 2,985,475, granted May 23, 1961.

This invention relates to an improved face seal and to an improved method for manufacturing face seals. In particular, the invention relates to an improved mechanical seal of the face type wherein the face members are constructed from press formed sheet metal rather than being machined from solid stock of metal, carbon, or other of the materials heretofore used in face seals. The face members of this invention comprise sheet metal rings with one or more axially extending flanges supporting a radial face member which is lapped, ground, or otherwise provided with a flat sealing face surface after being coated with a wear-resistant material. The invention also relates to a method for accomplishing this wear-resistant surfacing. The invention also relates to improvements in face seals of the utilized type which are sold and installed as a unit, in contrast to face seals comprising several separate elements which have to be separately installed.

Mechanical seals of the face type are used to provide a positive fluid seal between a housing and a relatively rotating shaft. Heretofore they have been expensive to manufacture and their accurate installation has been tedious. Often the sealing faces have been damaged by abrasive foreign matter getting in between the faces during or prior to installation; then the assembled faces have not sealed tightly against each other and the dirt or other foreign matter has been ground into the faces producing permanent scratches. These are, in brief, the general problems which this invention solves.

One reason why face seals have heretofore been expensive is that the two face elements have heretofore been machined individually and from two different kinds of materials. Conventionally, one face has been machined from a thick solid piece of high grade metal so that both the material and its machining have been expensive. The other element has conventionally been made from less rigid material such as bearing metal or brass, or from non-metallic materials such as carbon. This less rigid element was also machined, either from solid bar stock or from specially formed rings. Wear of the mating surfaces during their relative rotation was primarily prevented by the selection of two materials with low coefficients of friction relative to each other. Lubrication by a thin film of the material being sealed is always of assistance but cannot be relied upon as the sole factor in wear prevention. The heavy metal face sealing members were either machined to provide an integral supporting portion, or the face-sealing member was mounted in a completely separate supporting member. The use of a separate metallic supporting member was general with carbon and other non-metallic faces, the carbon face element being cemented or otherwise secured to the supporting member, and this has meant that the supporting members, too, had to be carefully machined.

The present invention has solved this problem by providing a way in which both face sealing elements may be formed from the same kind of inexpensive sheet metal. Press formed sheet steel may be formed to provide flat rings, and these rings may then be reformed to provide supporting flanges that impart a desired degree of rigidity to the radial portions that are to provide the sealing faces. In many instances it is desirable for one radial face member to have greater sectional rigidity than the other, and these different rigidities can be obtained by forming flanges of different axial length or different radial position, or both. In some instances, the radial surfaces to be used as sealing faces are coated with a suitable facing material that provides a better sealing face than do most materials from which face seals have heretofore been made. Then the coated surface is lapped, ground, or otherwise finished until optically flat surfaces within three or four bands of helium light result. The invention incorporates the use of certain preferred treating or coating materials, although as will soon be made apparent, many such materials are suitable so that any desired structure can be adapted to use in any of the various conditions by application of the proper coating.

As indicated above, the present invention comprises a unitized seal, the term "unitized" being used to indicate a seal in which both face elements are assembled at the factory, together with the other elements (springs, cases, etc.) of the complete face seal so that installation of a seal merely involves insertion of a single unit in the housing bore and around the shaft. Unitization solves many problems. For example, when two face elements were installed separately (one face sometimes being a machined portion of the housing or the shaft), dirt or some foreign matter was liable to get in between them or on one of them; then, during the initial run-in, the foreign material would scratch one or both faces and damage the seal irreparably. Also, one or both faces were sometimes directly damaged or scratched during or previous to installation. In the completely unitized face seal of the present invention, the face elements are carefully assembled, usually under oil, in carefully controlled factory conditions and, once assembled, are held together so that they will not come apart at any subsequent time. Moreover, when installed, the face seal is automatically adjusted to the proper operating position. Injury to the face sealing element prior to and during installation is prevented; proper adjustment upon installation is assured and the product is easier to handle and gives more uniform results.

Another problem met in certain classes of face seal installations has been the ability of dirt, moisture and other foreign matter to work in between the faces after they have been installed and while they are being used. For example, face seals installed on truck axles and other places have had dirt, mud, water and so on flung up against them. The present invention comprises a novel combination of the face seal with a radial type of shaft seal which serves to exclude mud, dirt and other injurious elements from between the face sealing elements. This novel combination can be used in applications where the problem is presented.

A novel method of making face seals is also provided by this invention. It reduces manufacturing costs and provides a good seal from inexpensive basic materials without running up excessive labor costs.

Among the objects of the invention are the following: to reduce the cost of manufacturing face seals; to save time and labor in manufacturing face seals; to provide a face seal with superior faces; to enable the use of faces made from materials that do not provide the best structural support; to construct a face seal wherein the face sealing elements are flanged, sheet metal rings; to provide a unitized face seal using sheet metal face elements; to provide a novel type of sealing face incorporating sheet metal and a coating material; to provide a combination between sheet metal face elements and elastomeric elements thereby assuring snug sealing engagement of the seal with the shaft and housing bore; to protect the sealing faces prior to, during and after installation from direct damage and from inclusion of foreign matter; and to make installation simple and fool-proof.

In some forms of the invention even spring pressure on the faces and linear response to increased pressure is obtained by incorporating a different type of spring from those heretofore used in face seals. However, the invention is also applicable to the use of coil springs and other types of springs that have been conventionally used in face seals.

Other objects and advantages of the invention will appear from the following description of some preferred embodiments of this invention. These embodiments are presented as illustrative examples and by no means exhaust the numerous practical possibilities which the invention provides.

Figures 1, 2:
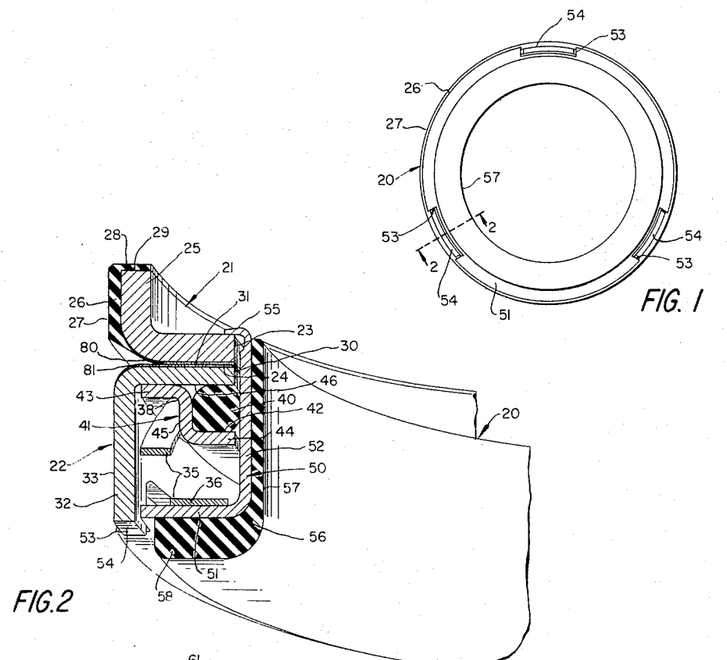
FIG. 1 is a view in end elevation of a unitized face seal embodying the principles of the present invention.
FIG. 2 is a fragmentary enlarged view in perspective and in section taken along the line 2—2 in FIG. 1. The seal is shown in the position assumed prior to installation with the spring urging the faces together and toward the opposite end of the case.
Figure 3:
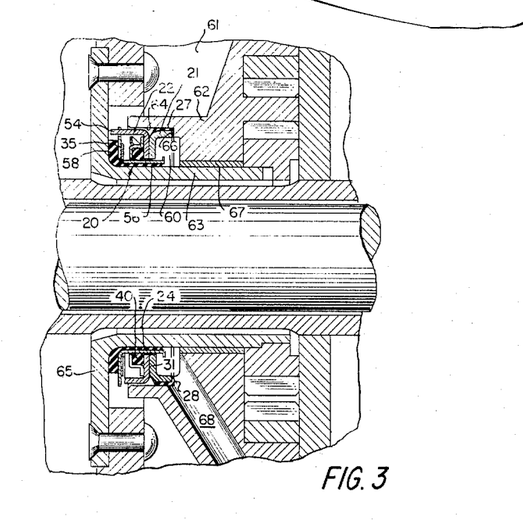
FIG. 3 is a fragmentary view in side elevation and in section on the scale of FIG. 1 of an automotive transmission incorporating the face seal of FIGS. 1 and 2, which is therefore shown installed in sealing relationship between a bore and a relatively rotating shaft.

*The seal 20 of FIGS. 1 through 3*

FIGS. 1, 2 and 3 show a unitized mechanical seal 20 incorporating two annular face-sealing elements 21 and 22, both formed from sheet metal such as press formed sheet steel. The element 21 is stationary relative to the bore, while the element 22 rotates with the shaft relative to the bore and to the element 21. Preferably, face members 21 and 22 are formed from stampings. For example, both may be stamped from pressed sheet steel, or one may be formed from sheet brass or sheet bronze and the other from sheet steel. But in any event both face elements 21 and 22 are of sheet metal.

The face sealing element 21 has a radial flange 23 whose face 24 is preferably coated and then lapped or otherwise finished to be substantially optically flat. The surface treatment will be explained later. The radial flange 23 is reinforced by forming the element 21 to provide an axially extending cylindrical portion or axial flange 25 at the radially outer end of the flange 23. The purpose of the cylindrical portion 25 is to provide sufficient sectional rigidity so that under normal conditions of use the face 24 will not be deflected more than a predetermined amount. For example, the amount of deflection desired may preferably lie within the range between 0.000016″ and 0.000032″.

Preferably, this self-reinforced face element 21 is bonded to a relatively heavy elastomeric body 26 whose cylindrical periphery 27 is calculated to fit snugly in the bore for which the seal 20 is designed. The elastomeric body 26 serves to prevent oil from leaking around the outside of element 21 and also serves to hold element 21 securely in the bore. A portion 28 of the elastomeric body 26 preferably covers the terminal edge 29 of the axial portion 25.

The other face member 22 has a radial flange 30 with a sealing face 31 (treated in a similar manner to the face 24) supported by an axially extending cylindrical portion or axial flange 32. The outer peripheral surface 33 of the axial flange 32 clears the bore, because its outer diameter is less than that of the surface 27.

Since the flange 32 is longer than the flange 25, it imparts greater sectional rigidity to the face 31 than the flange 25 imparts to the face 24. As a result, the face flange 23 is able to flux sufficiently to accommodate small deformations from the flat that may occur in the more rigid face flange 30. This may be necessary because of changes brought about in the face flange 30 as the effects of shock during operation, wearing of the seal, or other external conditions, or conditions happening during manufacture and installation of the sealing elemet. The flexibility of the flage 23 relative to the flange 30 will thus maintain (under spring pressure) non-leaking face-sealing contact even though the faces 24 and 31 are not quite completely flat. However, flatness is important for they should be flat within less than 3½ light bands of helium, and it is not desirable to have either flange 23 or 30 be too flexible.

Figure 11:
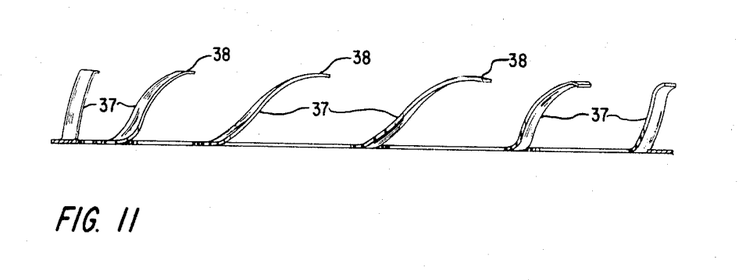
FIG. 11 is an enlarged view in side elevation and partly in section of the finger spring of FIGS. 9 and 10.

The faces 24 and 31 are urged into engagement with each other at all times by a suitable resilient compression member. As will be shown in some of the modifications later on, the compression member may comprise one or more coil springs, but in the present illustrative example a novel such member, so far as face seals are concerned, is employed; namely, a finger spring 35 best shown in FIGS. 9 through 11. The spring 35 has a base member 36 from the outer periphery of which a series of fingers 37 extend out in an axial direction. Each finger 37 terminates in a short, substantially flat upper end portion 38 and the slope of the fingers 37 is preferably substantially constant. This makes it possible to obtain substantially equal pressure around the spring 35 and, within the limited distance concerned, to obtain movement directly proportional to the pressure exerted on the spring.

In addition to the face sealing members 21 and 22 and the spring 35, the seal 20 incorporates an O-ring seal 40, with associated parts, and a metal case member 50. The case 50 has a radial portion 51 from the radially inner end of which extends a cylindrical portion 52. The case 50 may, like the members 21 and 22, be made from sheet metal, but none of its surfaces are employed as face sealing elements. Its radial portion 51 may be provided with notches 53 through which projections 54 of the flange 32 extend, thereby maintaining the elements 22 and 50 in in proper alignment, the torque lock this provides preventing relative rotation between them while still permitting a limited amount of relative axial motion.

The case member 50 unitizes the seal 20 when the end of its cylindrical portion 52 is turned radially outwardly to provide an end flange 55 *after* the elements 21 and 22, the spring 35, the O-ring 40, and its associated elements have been assembled into the case 50. While the flanges 51 and 55 prevent the parts of the seal 20 from coming out of the case 50, the elements 21 and 22 can still move freely with respect to the case 50 over a limited axial distance more than sufficient to accommodate the normal flexure expected in the installation.

The radially inner periphery of the axial portion 52 and the axially outer surface of the radial portion 51 are snugly fitted into an elastomeric lining 56 whose inner periphery 57 is adapted to fit leak-tight on the shaft upon which the seal 20 is to be installed. The lining 56 also serves to drive the case 50 so as to make it and the other parts attached to it rotate with the shaft. A leak-tight fit may be provided by molding the periphery 57 slightly undersize with respect to the shaft, the elastomer being able to give and flow sufficiently to accommodate the size differences during installation without permitting leakage after installation. The radial portion 58 of the lining 56 may serve as a bumper or guide or additional seating member for the seal during installation. Whether this portion 50 is used or not will depend upon the application for which the seal 20 is designed, but it will be obvious that it can be used to cushion the seal during installation and to prevent undesirable engagement of the projections 54.

As shown in the drawings, the base 36 of the spring 35 may be seated on the axially inner surface of the radial flange 51 of the case 50 while its upper end portions 38 urge the face 31 into contact with the face 24 for all positions of the sealing members 21 and 22.

It is, of course, necessary to prevent leakage of oil through the case 50 around the faces 24 and 31 so that oil will not leak through the clearance between the flange 55 and face member 21 through the clearance provided between the flanges 23 and 30 and the cylindrical portion 52 into the space between the case 50 and the face member 22 and out through the clearance between the projections 54 and notches 53.

The present invention solves this problem by providing an elastomeric O-ring 40 in combination with an annular, pressed steel keeper member 41. The keeper member 41 serves to provide an O-ring cavity 42 without any necessity for machining a groove into solid metal. The spring end portions 38 bear directly against a radial portion 43 of the stepwise keeper 41, which in turn rests against the back side of the flange 30. The radial portion 43 is connected to another radial portion 44 of the keeper ring 41 by an axial portion 45. The groove 42 is thus provided by the axial portion 45, the radial portion 44, and the radial portion 46 of the back side of the face flange 30. The spring 35 maintains the size of the groove or space 42. Thus, the spring 35 both keeps the elastomeric O-ring 40 in place and holds the two sealing faces 24 and 31 in sealing contact. When putting the seal 20 together, the faces are preferably assembled with oil or under oil. The spring 35 may be put into the case 50, the O-ring 40 and keeper 41 put in place over the spring 35, and the face element 22 inserted next, with its projections 54 extending through the notches 53. Then the other face element 21 is inserted with its face 24 in contact with the face 31. Finally, the flange 55 is turned over to lock the elements 21 and 22 into the then unitized seal 20. In its non-installed position, the spring 35 urges the rear side of the flange 23 into engagement with the case flange 55, but this is true only before installation; upon installation, the flange 23 is forced axially away from the flange 55, as will be seen presently. Thus, the two faces 24 and 31 are put into operative sealing relation from the very start, so that no foreign matter can get between them, and they remain together at all times prior to, during, and after installation.

FIG. 3 shows a typical installation of the seal 20. A portion of an automatic transmission is shown with the seal 20 used to seal against passage of oil from a chamber 60 to the outside passage 61. The seal 20 is positioned between a stationary pump housing 62 and a shaft 63 that rotates relative to the housing 62. The housing 62 is provided with a bore 64, and installation of the seal 20 is accomplished by pushing it into the bore 64 so that its elastomeric periphery 27 seals against the bore 64. Then, the shaft 63 is inserted into the housing 62 and into the seal 20, engaging the inner elastomeric member 56 and sealing snugly. In the present instance, the pushing is continued until a flange 65 on the shaft 63 engages the rubber bumper portion 58 in a sealing relation. It will be noted that the end portion 28 snugly engages the end wall 66 of the housing bore 64, so that the spring 35 is partially compressed and the flange 23 is moved away from the flange 55. Of course, either the bore 64 or the shaft 63 may rotate, but the installation has been described as relative rotation, which is the important thing.

During rotation, oil lubricates the bearings 67, enters the chamber 60, and flows to some pump elements through a passage 68. The faces 24 and 31 seal against each other and prevent oil from leaking from the chamber 60 into the passage 61. At the same time, the O-ring 40 forms a stationary seal between the stationary casing 50 and the stationary face element 22.

*Face coatings and their application*

Face coatings are necessary for these seals when cold-rolled sheet steel of drawing or commercial quality is to be used. Since there are substantial economic savings in using this relatively inexpensive material to form the face sealing elements 21 and 22, the cost of the coatings is a minor item. The coatings impart lubricity, abrasion-resistance, heat-resistance, and other qualities required when the faces operate at high speeds. Several kinds of coatings are suitable, and which one will be chosen may depend upon the type of service for which the seals are designed. For example, it makes a difference whether the seals are to operate in a lubricating medium or a non-lubricating medium, in an abrasive atmosphere, or in a normal sealing atmosphere.

Figure 4:
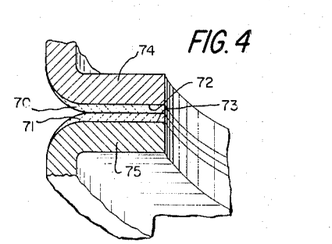
FIG. 4 is a fragmentary enlarged view in perspective and in section of a portion of two face sealing flanges wherein the engaging faces are covered with a ceramic-type of wear-resistant coating material.
Figure 5:
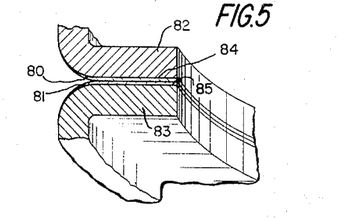
FIG. 5 is a view similar to FIG. 4 illustrating faces treated with a metallic-type of wear-resistant coating.

One excellent type of coating is exemplified by FIG. 4 where relatively thick ceramic coatings 70 and 71 have been applied to two faces 72 and 73 of sheet metal radial flanges 74 and 75. The ceramic coatings are preferably applied to a thickness of 0.01″ to 0.04″ on the raw surface of the sheet metal (which usually is about 0.05″ to 0.1″ thick). Then the ceramic surface is lapped (or otherwise finished) to obtain an optically flat surface within 3½ light bands of helium. Flatness within 4 light bands has been found to be critical. If the faces are more than 4 light bands out of flat, they leak. The flattening operation is carried on after application of the coating material. Due to the thickness of the layers 70 and 71, a considerable amount of it may be removed in this flattening operation if desired, usually leaving a coating thickness of from slightly less than 0.01″ up to about 0.025″.

There are several kinds of suitable ceramic or refractory coatings. For example, alumina (aluminum oxide), zirconia (zirconium oxide), and titania (titanium oxide) and mixtures of them are suitable. Aluminum oxide coatings suitable for spray applications are sold by the Norton Co. as "Rokide A" and by Flame Ceramics of Santa Monica, California. A similar material sold by Metco, Inc., as "Thermospray No. 101" comprises alumina with 2½% titanium oxide. Zirconia is available from Metco, Inc. as "Thermospray No. 201" (93% zirconium oxide, 5% calcium oxide, 0.5% aluminum oxide, and 1.5% other ingredients), from the Norton Co. as "Rokide Z," and from Flame Ceramics. Titanium oxide is available from Metco as XP1114. These coatings may be applied by using an oxyacetylene flame with or without an air blast (cf. U.S. Patent No. 2,707,691).

An additional treatment for ceramic faces, which sometimes (as with alumina and zirconia) tend to be porous, is to coat them with a filler or sealer such as phenolic resin or silicone resin. The filler is then cured in situ and fills the pores, thereby preventing lapping compound from becoming embedded in the pores during the subsequent lapping, prevents abrasive material from loading up the pores at any time, and prevents lubricant from seeping through interlocking pores.

In addition to ceramic coatings it is possible to coat the sheet metal faces with certain metals such as molybdenum metal sold in a 99½% pure state as "Spraybond" by Metco Co., Inc., or a stainless steel sold by the same company as "Thermospray No. 42F" (2% Ni, 10% Cr, 1% Si, balance Fe) or "Metcoloy No. 2" (high-chrome stainless) or "Aluminum Iron Bronze" (90% Cu, 9% Al, 1% Fe) sold by the same company as "Thermospray No. 51F." These metals are applied in the same general manner as the ceramic-type coatings and to the same thickness before lapping, but they have different properties and are used as applied. These metals are hard and tough. Although not as abrasion-resistant or heat-resistant as the ceramic, they expand and contract more uniformly with respect to the base metal and have good wear resistance. Excellent results are obtained for many seals by having one face ceramic coated and the other metal coated.

In addition to these coatings there are also hard coatings which are applied as powder and deposited either by an oxygen-acetylene flame with subsequent fusing or sintering in a controlled atmosphere furnace at temperatures between approximately 1800–2100° F., or deposited by a plasma arc flame and used as is. The powders used for application by flame spraying with subsequent fusing or sintering can be alloy metals such as nickel, iron, or cobalt-base powders. For deposition by "plasma flame" the same alloy metals can be used together with other high melting and refractory materials and carbides such as tungsten carbide. The plasma arc enables deposition of materials with very high melting point which can not be deposited with other flame-spraying equipment.

Such powders are manufactured by Metco, Inc., Coast Metals and Colmonoy, with the following qualities:

Metco Powders:
    TS–16C ____. Nickel base (2.5% Fe, 16% Cr, 4% Si, 4% B, 3% Cu, 3% Mo, balance nickel).
    TS–15E ____. Nickel base (4% Fe, 17% Cr, 4% Si, 3½% B, balance Ni).
    TS–31C ____. High percentage tungsten carbide.
    TS–34F ____. High percentage tungsten carbide.
    XP–1122 __. Tungsten carbide.

Coast metal powders:
    1267E _____ Iron base (1.5% C, 1% Si, 2% Mn, 5% Cr, 2% Ni, 20% Co, 2% Mo, 2% Cu, 3¼% B, balance Fe).
    6685 ______ Cobalt base (.6% Fe, 4% B, 1.25% Si, .5% Ni, .15% Cr, balance Co).

Colmonoy powders:
    56 ________ Nickel base alloy (similar to TS–16C).
    6 _________ Nickel base alloy (similar to TS–16C).

These powder materials can be chosen to give desired characteristics to the sealing surface of the face seal face. The characteristics may be high hardness, wear and abrasion resistance, high and low temperature resistance, low friction and dry run ability. By themselves the materials do not have the structural rigidity required of a face seal face. Similarly, the ceramics are too brittle, the material requiring sintering or fusing after application at elevated temperature to obtain desired properties tend to melt and run away or warp beyond use. The high temperature refractories like tungsten carbide, due to their extremely high melting point, cannot be used economically other than with application by a plasma flame torch.

Another advantage of many coatings on sheet metal stampings is that they form an excellent bond with the stamping thus increasing the strength of the stamping. By using a sheet metal stamping as the structural part of the face, we can use materials for the face which we could not otherwise consider because they are either too weak structurally (e.g., $Al_2O_3$), too difficult, or impossible, to fabricate by known techniques (e.g., tungsten carbide), impossible or impractical to design into the seal space required (e.g., most ceramics) are too brittle, too porous, or for other reasons require a tough structural substrate (e.g., most ceramics), or are too expensive to consider except in a composite structure.

The materials themselves may add some or all of the following characteristics, due either to the characteristics of the material or to its physical structure: low dry friction (e.g., cobalt), abrasion resistance (e.g., hard metals), wear resistance (e.g., tungsten carbide), good oil film distribution (e.g., $Al_2O_3$), galling resistance (e.g., Ni base TS–16C), low coefficient of friction with its mating face in application (e.g., Coast cobalt 6685), high heat resistance (e.g., tungsten carbide and ceramics), superior wear at high surface speeds (e.g., 6685 cobalt), hardness associated somewhat with wear and abrasion resistance but important for passing hard particels through without their becoming embedded, (e.g., Coast 1267), and improving the structural strength of the composite (e.g., Metco 16C and Coast 1267).

*Theoretical considerations*

There is a pressure drop due to centrifugal force across the radial distance between the inner and outer circles of engagement of a face seal, if there is a fluid between the faces. The rules of fluid mechanics apply, particularly the equation for the pressure gradient $dp/dr$ namely:

$$\frac{dp}{dr} = \frac{\rho v^2}{r}$$

where $\rho$ is the mass density of the fluid being sealed, $v$ is the velocity of the fluid along its curved path as it moves along a circle between the two relatively rotating faces, and $r$ is the radius of curvature of the fluid path, i.e., the radius of the circle along which the fluid element being considered is moving.

Since $v=\omega r$, where $\omega$ is the angular velocity, $dp=\rho\omega^2 r dr$. We can, then, integrate to obtain the pressure drop:

$$p_2-p_1=\frac{\rho\omega^2}{2}(r_2^2-r_1^2)$$

where $r_1$ is the inner radius, $r_2$ is the outer radius, $p_1$ is the pressure at the inner periphery, and $p_2$ is the pressure at outer periphery.

There will be fluid between the faces if the average pressure, $p_{av}$, due to the fluid is in balance with the unit load applied by the spring, or other method, tending to urge the faces together or if the pressure of the fluid is greater than this. In the latter case the seal will leak. The average pressure is found by first considering $p_r$, the pressure at any radius $r$, which is given by $$p_r=p_1+\frac{\rho\omega^2}{2}(r^2-r_1^2)$$

The total force F due to fluid pressure is found by integrating the equation $$F=\int_{r_1}^{r_2} 2\pi r p_r dr$$

Substituting the preceding equation for $p_r$, we get $$F=2\pi p_1\int_{r_1}^{r_2} r dr - \pi\rho\omega^2 r_1^2\int_{r_1}^{r_2} r dr + \pi\rho\omega^2\int_{r_1}^{r_2} r^3 dr$$

$$=p_1\pi(r_2^2-r_1^2)-\frac{\pi\rho\omega^2 r_1^2}{2}(r_2^2-r_1^2)+\frac{\pi\rho\omega^2}{4}(r_2^4-r_1^4)$$

However, $$p_{av}=\frac{F}{A}$$

where A is the area over which the force is applied; and $A=\pi(r_2^2-r_1^2)$, so:

$$p_{av}=p_1-\frac{\rho\omega^2 r_1^2}{2}+\frac{\rho\omega^2}{4}(r_2^2+r_1^2)$$

$$=p_1+\frac{\rho\omega^2}{4}(r_2^2-r_1^2)$$

If the unit load on the faces urging them together is greater than $p_{av}$, the seal will not leak, and the seal will run with only the absorbed film for lubrication; there will not be fluid between the faces. Face seals are designed to run under this condition. Hence, the materials from which they are made are important in holding friction down and in enabling long running time without substantial wear. Moreover, if the faces are not sufficiently flat compared with the film thickness there will be irregular gaps where leakage can occur.

This theory will be better understood by considering a specific example. Consider a face seal similar to that of FIGS. 1 and 2 encircling a shaft of 1.75 inch diameter and fitting in a 2.5 inch bore. The face has a 2.5 inch outer diameter and a 2.125 inch inner diameter. The shaft rotates at 3600 r.p.m. Lubricating oil with a specific gravity of 0.82 is used. The ambient pressure communicating with the outer radius of the seal is atmospheric pressure. Oil is assumed to fill the cavity communicating with the inner radius of the seal, with atmospheric pressure communicating with this cavity so that any pressure built up within it is due to centrifugal force. The pressure at the shaft surface is then atmospheric pressure. Centrifugal force causes a pressure $p_1$ at radius $r_1$. Atmospheric pressure will be the reference, considered as zero, so that the pressure found will be pressures above atmospheric. By an equation similar to the above, the pressure $p_1$ can be calculated as follows, where $r_s$ is the shaft radius:

$$p_1=\frac{\rho\omega^2}{2}(r_1^2-r_s^2)$$

$$=\frac{.82\times 62.4\times 3600^2\times 4^2(1.0625^2-.875^2)}{2\times 32.17\times 3600\times 144^2}=1.98 \text{ p.s.i.}$$

The pressure drop across the faces, if there is a film of oil present, is obtained using the earlier given equation $$p_2-p_1=\frac{\rho\omega^2}{2}(r_2^2-r_1^2)$$

$$=\frac{.82\times 62.4\times 3600^2\times 4^2(1.25^2-1.0625^2)}{32.17\times 3500\times 144^2}=2.35 \text{ p.s.i.}$$

Therefore $p_2=4.33$ p.s.i. under the conditions considered.

The average pressure may be found by substituting values in an earlier given equation, $$p_{av}=1.98+1.178=3.16 \text{ p.s.i.}$$

In the above development we have considered the oil to be inside the inner radius of the seal and the atmosphere to communicate with the outer radius. Face seals are also made to run with the oil outside the outer radius and the atmosphere communicating with the inner radius. This is sometimes advantageous because the effect of centrifugal force results in a lower pressure at the inner radius than at the outer radius if there is oil between the faces, and therefore aid sealing if the oil being sealed is outside the outer radius of the faces. For low speed applications or applications where the oil cavity is not pressurized, seals with the oil inside are entirely satisfactory and are used in many applications where seals of this configuration are easier to make or install. However, for high speed applications or applications where the oil cavity is pressurized, seals are often made so that the oil is outside. In this case, equations similar to those given are written for the average pressure and the pressure at the inner radius in terms of the pressure at the outer radius, and the pressure due to centrifugal force at that radius is calculated and used for finding the average pressure and the pressure at the inner radius from these equations.

*Theoretical determination of permissible out-of-flatness*

If there is fluid between the faces but the seal is not leaking, the pressure in the fluid in the portion adjacent to the ambient air must be supported by the surface tension of the fluid at the meniscus which will exist. For this equilibrium condition the thickness, $t$, of the fluid film is given by $$t=\frac{2y}{p}$$

where $y$ is the surface tension. This same equation gives the maximum gap that can be tolerated between the faces under given conditions if leakage is to be prevented, and therefore the maximum deviation from flatness. The surface tension has been found to be of the order of $9.5\times 10^{-5}$ lb./in. for lubricating oils. For the example above, substituting in the equation $$t=\frac{2\times 9.5\times 10^{-5}}{4.33}=4.38\times 10^{-5} \text{ in.}$$

One interference light band of helium is $1.16\times 10^{-5}$ inch; so theoretically, imperfections of about 4 light bands can be tolerated. But this, of course, disregards changes in surface tension due to temperature, kind of lubricant, irregularities not detected by the optical flat, the possibility of imperfections in the two faces being adjacent, etc.

*Experimental determination of flatness requirements*

The above theoretical consideration is checked by experiment. For example, sixteen pairs of faces were lapped to varying degrees of flatness ranging from 2 to 5 light bands of helium. These pairs were checked with a control plug that was the same size as the parts being lapped. Each pair of faces was set up in a seal test assembly and run for 30 minutes. Records were maintained on leakage and time for all pairs.

All the faces lapped to a flatness within 3½ helium light bands sealed without failure. All the faces lapped to a flatness of 4 light bands or greater leaked. The faces lapped to flatness between 3½ and 4 light bands were not dependable; some did not leak, but others did. These experiments indicate that the factors neglected in the theoretical consideration mount up, and that the faces should be lapped to a flatness within 3½ helium light bands.

*Other considerations concerning flatness*

For many purposes, the flatness of the face means little if measured in the free state. What is important is that the sealing faces be flat when they are in actual contact with each other under actual sealing conditions. Thus, two previously flattened faces formed on sheet metal flanges may be pressed to flatness if not quite flat already, and the flanges of the face seals of this invention are subject to this flattening action by the spring element of the face seal. Therefore, the flatness of the faces is preferably measured under the same conditions under which they will operate, in order to determine how flat they will be when they are in operating position.

The present invention incorporates as one factor thereof a preferable method of obtaining a flat face. In this method the sheet metal face flanges are spring (or otherwise) loaded during the lapping or grinding process (after the ceramic coating) to the same degree that they will be loaded by the spring during actual service. In other words, the spring pressure on the faces should duplicate the pressure to which they are subjected when they are being lapped. Due to the relatively low sectional rigidity of the sheet metal faces as compared with solid, thick metal members such as solid bar stock machined to provide the face, the degree of out-of-flatness would tend to be much more than that permissible when the faces are not loaded, but by using this process the flatness under operating conditions can be held within the desired range.

*Theoretical consideration of the effects of vibration on seal components*

If a shaft upon which one element of a face seal is mounted does not run exactly true, or if there are other sources of vibration, the faces of the seal are subjected to a forced vibration having a frequency of one cycle per revolution of the shaft, or as determined by the external source of vibration. This vibration will be damped somewhat, but usually not very much, so a curve having a resonance peak will result if the ratio of the amplitude of vibration to the deflection caused by a static force of the same magnitude as that causing the vibration is plotted against the ratio of the frequency of the vibration to the lowest natural frequency of vibration of the system. Such a curve may be found in any stanadard text on vibrations, e.g., at page 65 of Mechanical Vibrations by W. T. Thompson. The resonance peaks of these curves show that there will be trouble if the exciting frequency is equal to or very close to the lowest natural frequency of the system.

The lowest natural frequency of vibration of a ring is given by the equation $$f_2 = \sqrt{\frac{KI}{\frac{4}{Ar}}}$$

where $f_2$ is the lowest natural frequency of the ring,
K a constant depending on the material from which the ring is made,
I is the moment of inertia of the section about the appropriate axis,
A is the cross-sectional area, and
r is the radius to the centroid of the section.

It is impractical for the ratio of actual frequency, $f_a$ to $f_2$ to be substantially greater than 1, for this could be obtained only by rings with a very large radius or very low moment of inertia compared to the area. Large radii are generally undesirable and a ring having a low moment of inertia along the plane of the ring has a high moment of inertia along an axis perpendicular to the plane of the ring, and vibrations along both axes are important.

When operating where $f_a/f_2$ is less than 1, satisfactory operation can be obtained where $f_a/f_2$ is less than one-half; or in other words, where the lowest natural frequency of the face seal is at least twice the maximum shaft revolution frequency. By this means as the referred to curves show, the magnification of vibrations can be kept between 1 and 1.3.

Successful operation in this range requires that the radius of the ring be small and that the section have adequate stiffness in both directions with a minimum of area. The flanged sheet metal face sealing elements of this invention meet these requirements very well, even better than solid body face sealing elements of comparable radius and face area.

For example, the lowest natural frequency of vibration perpendicular to the plane of a ring can be given by the equation $$f_2 = \frac{1}{2\pi}\sqrt{\frac{EI}{A\rho r^4}\frac{35}{5+\mu}}$$

where $f_2$ is the lowest natural frequency
E is the modulus of elasticity
I is the moment of inertia about an axis through the centroid of the section and perpendicular to the direction in which the ring vibrates
$p$ is the mass density of the ring
A is the section area
r is the radius to the centroid of the section
$\mu$ is Poisson's ratio The lowest natural frequency of vibration in the plane of the ring is:

$$f_2 = \frac{1}{2\pi}\sqrt{\frac{35EI}{5A\rho r^4}}$$

Figure 16:
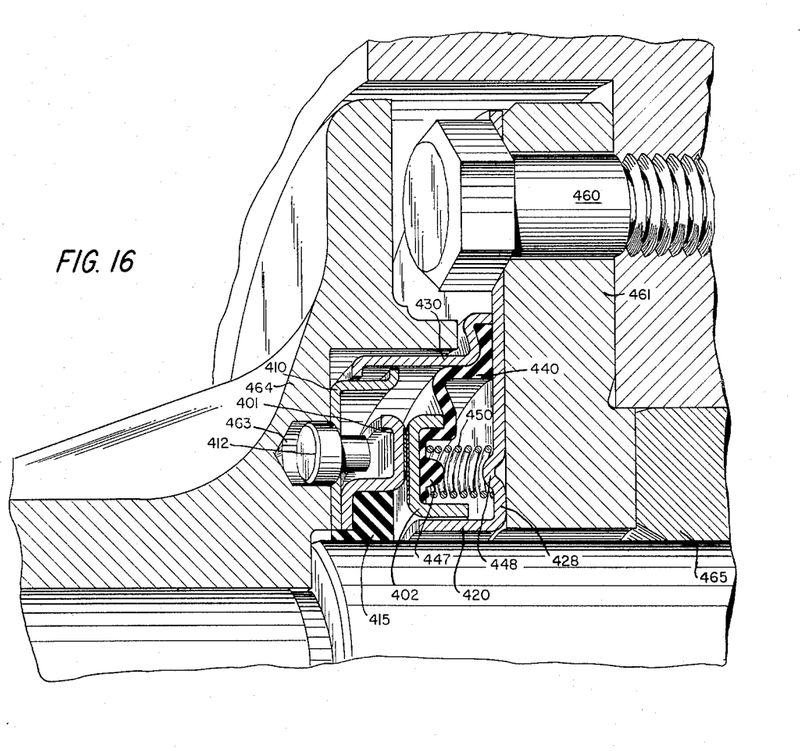
FIG. 16 is a fragmentary view in perspective and partly in section of the upper portion of an installation incorporating the seal of FIG. 15, which is shown here in its operational position.

As a specific example, take a face seal like the one shown in FIG. 16 wherein 0.060" sheet steel is used and wherein the inner diameter of the face element 401 is 2.328", where the flange 403 is .312" wide, the flange 405 is .065" long, the flange 404 is .328" long, and the flange 407 is .190" wide. Its lowest natural frequency of vibration in the plane of the ring may be calculated as indicated above and will be found to be 120,600 cycles per minute. Its lowest natural frequency perpendicular to the plane of the ring is similarly found to be 92,700 cycles per minute —both of which are many times as great as the maximum shaft speed for which these seals are designed.

When the face element 402 has a flange 420 that is .4995" wide, a flange 421 that is .252" long, and a flange 422 that is .127" long, the lowest natural frequency of vibration in the plane of the ring is 137,700 cyles per minute and perpendicular to the plane is 66,000 cycles per minute. Thus, these sheet metal face seals will not be greatly affected by such vibrations at the frequency of shaft rotation.

*A modified form of face seal 100 (FIGS. 6 and 7)*

Figure 6:
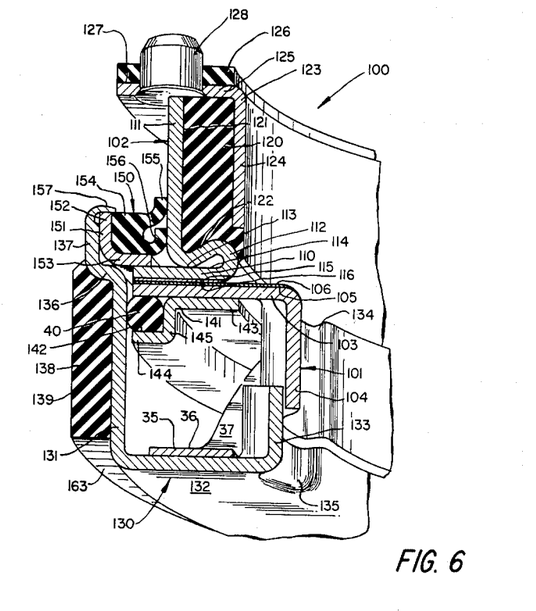
FIG. 6 is a fragmentary view in perspective and partly in section of another unitized face seal embodying a modified form of the invention. The seal is shown in its pre-installation position.

FIG. 6 shows a modified form of face seal 100 also embodying the principles of the invention and again comprising two face sealing elements 101 and 102 made from sheet metal. By way of example, the faces are ceramic coated.

The member 101 comprises a flange 103 and an axial supporting flange 104. The flange 103 is coated with ceramic 105 and lapped to provide one of the radial sealing faces 106.

The other face element 102 has a radial flange 110 and an axially extending cylindrical portion 111 connected to the radial portion 110 by a sharp radius portion 112 so that a portion 113 of the axial flange 111 rests against the back side 114 of the flange 110. The flange 110 is coated with ceramic 115 and lapped to provide the second radial sealing face 116. This type of flange and flange-supporting construction of the element 102 may be referred to as a "shotgun case" type of structure.

A heavy rubber or synthetic elastomeric reinforcing body 120 is bonded to the radially inner surface 121 of the cylindrical portion 111 as well as the back side 122 of the radius portion 112. The body 120 is further reinforced by a sheet metal ring 123 having a cylindrical portion or axial flange 124 and also having a radial flange 125. The radial flange 125 may be provided with a gasket 126 against its axially outer surface 127 and may also support torque-lock pin 128 for securing it for rotation with a shaft, as described later.

The face sealing element 101 is torque-locked to a case 130 having a radially outer cylindrical portion 131, a radially extending web 132, and a radially inner, axially in-turned flange 133. Torque-lock between the case 130 and the member 101 may be provided by axially extending radial ribs 134 and 135 formed in the two members at spaced points around the periphery. The case 130 is also provided with a radially outwardly extending step portion 136 leading to an axially extending portion 137. An elastomeric body 138 is bonded to the outer surfaces of the cylindrical portion 131 and radial step 136 and its outer periphery 139 is adapted for snug sealing engagement with a bore into which the seal 100 is inserted, being slightly oversize.

The spring 35 and O-ring 40 are employed as before, the O-ring 40 being enclosed by a keeper ring 141 like the case 41 and having an O-ring receptacle 142 with a pair of radial flanges 143 and 144 joined by an axial portion 145. The spring 35 and O-ring act in the same manner as in the seal 20.

A novel feature of the seal 100 is its incorporation of a shaft sealing unit 150 to lock out moisture, dirt, and other foreign matter and prevent their getting in between the faces 106 and 116. The unit 150 comprises a reinforcing sheet case 151 having an axially extending cylindrical portion 152 and a radial portion 153 into which a body 154 of elastomeric material is bonded. The body 154 is provided with a pair of lips 155 and 156. The seal 150 is held in place by a turned-over radially in-turned flange 157 on the case 130 which engages the flange 152 when the spring is forcing the seals to their outermost position. The flange 157 also serves to unitize the seal 100.

Figure 7:
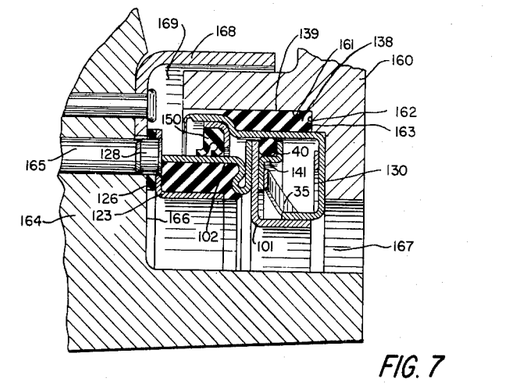
FIG. 7 is a view in elevation and in section, on a reduced scale as compared with FIG. 6, of the upper portion of an installation incorporating the face seal of FIG. 6, the seal elements now being in their operational positions.

FIG. 7 shows a portion of a tractor final drive incorporating the seal 100. A frame member or housing 160 provides a bore 161 with end wall 162 in which the elastomeric body 138 fits with its radial end wall 163 in contact with the wall 162. The locking pins 128 provide a torque lock for the member 102 and its associated elements with a rotating hub 164 by engaging openings 165 therein. The gasket 126 engages the wall 166 and prevents leakage at that point. The faces 106 and 116 rotate relatively and prevent leakage of oil from a chamber 167 while the O-ring 40 prevents leakage around the faces. The shaft seal 150 prevents foreign matter from getting to the faces when the foreign matter gets by a guard 168 into a space 169. Installation of the seal 100 may be accomplished by first pressing it into the bore 162 and then inserting the shaft member 164.

*Another modified form of seal 200 (FIG. 8)*

Figures 8, 9, 10:
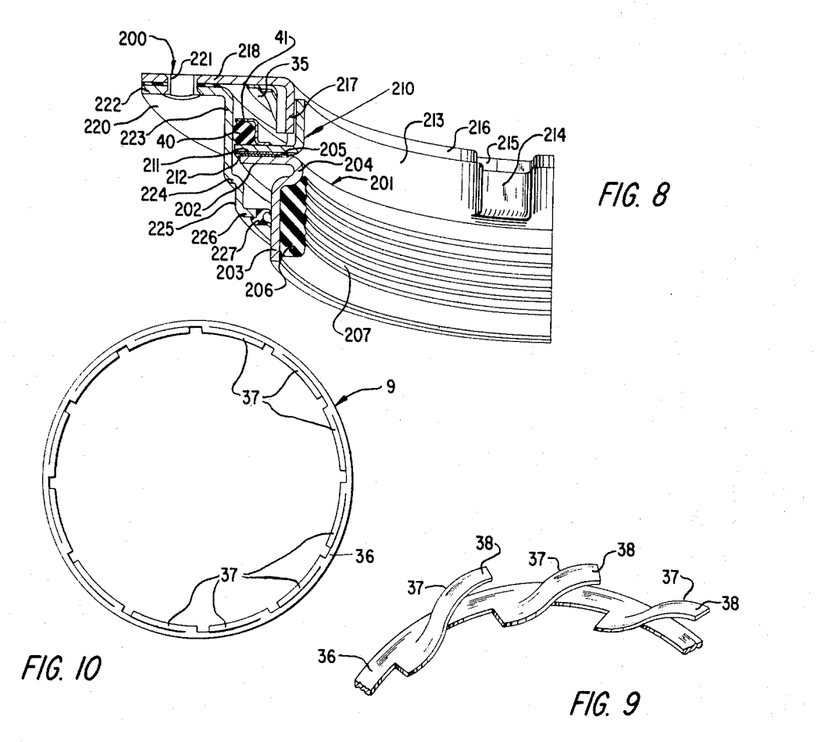
FIG. 8 is a view similar to FIG. 6, though on a reduced scale, of another unitized face seal embodying another modified form of the invention.
FIG. 9 is a fragmentary view in perspective of a portion of a finger spring like those used in the seals of FIGS. 1–3 and 6–8.
FIG. 10 is a top plan view of a complete finger spring like that of FIG. 9, but shown on a reduced scale as compared with FIG. 9.

FIG. 8 shows a seal 200 which has some resemblance to the seals previously discussed and some significant differences. Its face sealing element 201 has a shotgun case structure similar to that of seal 100 in FIG. 6 with a radial flange 202 backed by a cylindrical portion 203 and shotgun turn 204 to impart a desired degree of rigidity to the ceramic coated and lapped face 205. An elastomeric member 206 is preferably bonded to the cylindrical portion 203 and is preferably provided with a roughened periphery 207 that fits snugly around the shaft member (not shown).

The other face member 210 has a face flange 211 with a coated and lapped face 212 and a cylindrical portion 213. The cylindrical portion 213 may be locked against torque by indentations 214 that are mated with indentations 215 in a case member 216. The case 216 has an axial cylindrical portion 217 and an end flange 218. The end flange 218 is preferably locked to a case 220 by rivets 221 that extend into an end flange 222 in the case 220.

The case 220 has a radially outer axial or cylindrical portion 223, a radially inwardly stepped portion 224, a radially inner axial or cylindrical portion 225, and a radially in-turned end wall 226. A double-lip dust seal 227, generally like the dust seal 150 in FIG. 6 is bonded to and supported by the end wall 226 and rides on the cylindrical portion 203 of the member 201. As in the seals 20 and 100, there is a finger spring 35, an elastomeric O-ring 40, and a keeper 41 which operate the same as in the seal 20. The general operation and installation of this seal are the same as those previously described. The seal 200 is drawn in its partially compressed (operational) position, whereas in its normal position prior to installation the back side of the flange 202 would engage the portion 224 due to the spring pressure.

Figure 12:
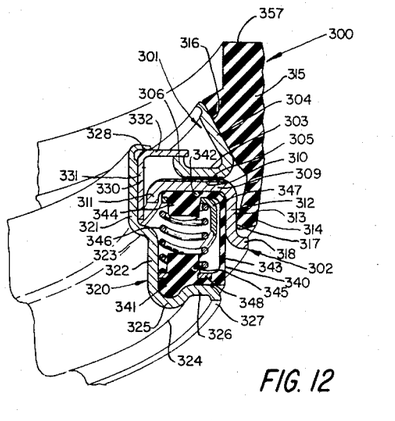
FIG. 12 is a fragmentary view in perspective and partly in section of another unitized face seal embodying a still further embodiment of the invention. The section is taken along line 12—12 in FIG. 13. The seal is shown in its preinstallation position.
Figure 13:
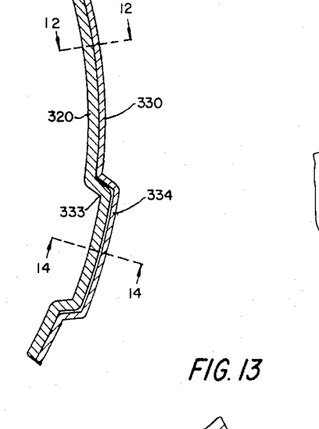
FIG. 13 is a fragmentary sectional view of a portion of the seal of FIG. 12, taken along the line 13—13 in FIG. 12.
Figure 14:
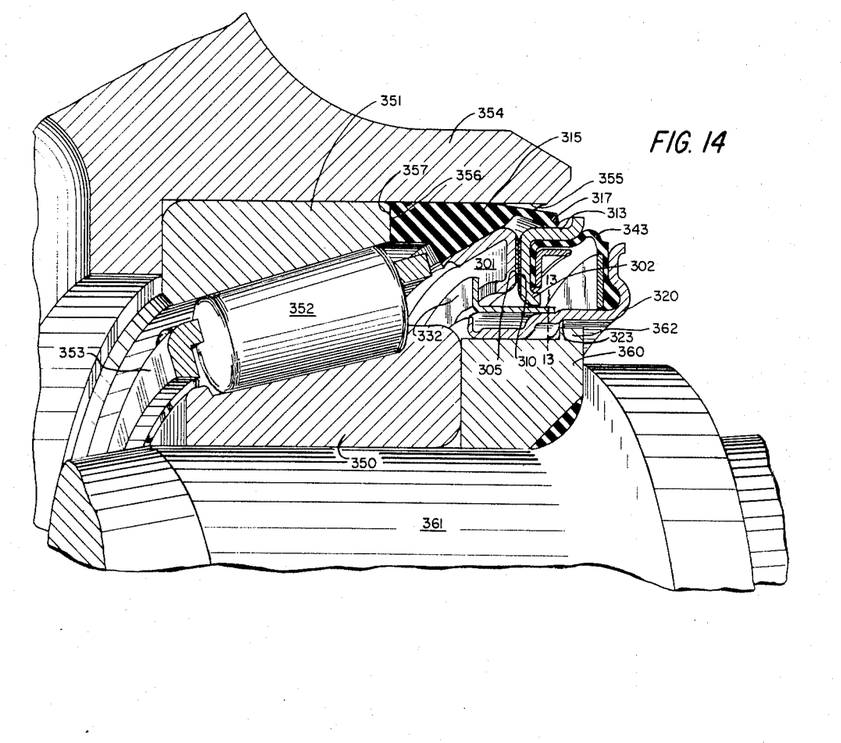
FIG. 14 is a fragmentary view in perspective and partly in section of an installation incorporating the face seal of FIG. 12, but taken in this instance along the line 14—14 in FIG. 13 and with the seal elements in their operational position.

*The seal 300 of FIGS. 12–14*

The seal 300 shown in FIGS. 12–14 also has two sheet metal face sealing elements 301 and 302. The face sealing element 301 has a radially extending face flange 303, a radially outer axially extending frusto-conical flange 304 providing the principal support for the lapped and ceramic-coated face 305, and a short radially inner flange 306.

The element 302 has an flange 309 lapped and surfaced to provide a face 310. Its radially inner periphery may be supported by a short stiffening axial flange 311, and its radially outer periphery is given the principal support by a longer axial flange 312. The axial flange 312 has an outer cylindrical surface 313 which is utilized as a shaft in conjunction with a dirt-excluding radial sealing element 314 which is part of an elastomeric body 315 that grips the radially outer surface 316 of the frusto-conical flange 304 of the face element 301. The shaft seal 314 is an axially extending unsupported portion of the body 315 and is provided with a lip 317 riding on the surface 313. The flange 312 may terminate in a short outwardly extending portion 318.

A sheet metal case 320 may be formed to provide two cylindrical, axially extending portions 321 and 322 joined by a generally radial step 323. It may also have a generally radially outwardly extending portion 324 at one end which may be provided with a cup portion 325 as well as truly radial portion 326, and terminates in an axially out-turned portion 327. At its opposite end a radially out-turned flange 328 secures therein a sheet metal ring 330 having an axial portion 331 cupped in the portion 321 and a radial portion 332 that extends radially outwardly beyond the flange 328 and on the rear side of the axially extending flange 306 to unitize the seal. The flange 328 is, of course, turned over after assembly of the seal. The case 320 and ring 330 are locked together by indentations 333 and 334, as shown in FIG. 13.

Instead of the O-ring 40, a rubber bellows member 340 is employed. The member 340 has one base portion 341 mounted in the cup 325 and against the radial portion 326, and another radially extending portion 342 secured against the rear side of the flange 309 between the two axially extending portions 311 and 312. The radial portions 341 and 342 are connected by an axially extending diaphragm or bellows portion 343. Being a single molded unit there is no danger of leakage through it, and leakage around it is prevented by the gasketing of its portions 341 and 342 against the flange 309 and the case portion 324. Integral guide buttons 344 and 345 may be provided for mounting coil spring 346. A flanged seating cup 347 may be employed at the end 342 in conjunction with the coil springs 346, if desired, as may a seating washer 348 at the opposite end 341.

Thus, the seal 300 does not employ a finger spring but rather a plurality of coil springs 346 as the resilient urging element holding the faces 305 and 310 in sealing engagement. The bellows 340 serves the same general function as the O-ring 40 and in addition holds the springs 346 in place. Also, the face members 301 and 302 are made somewhat different configurations to provide the shape needed for retaining the bellows element 340 and for obtaining the desired sectional rigidity.

A typical installation of the seal 300 is shown in Fig. 14. A tapered roller bearing assembly includes a cone 350, a cup 351, a series of tapered roller bearings 352, and a cage 353. A housing 354 provides a bore 355 receiving the cup 351 and the outer periphery of the elastomeric body 315. A face 356 on the cup engages a face 357 of the body 315. An inner member 360 adjacent the core 359 rides on a shaft 361 and its axle collar 362 engages the step 323. Then the flange 362 and face 356 force the sealing members 301 and 302 away from the flange 332, thereby compressing the bellows 343 as shown in Fig. 13. The faces 305 and 310 rotate relatively and prevent escape of lubricant from the bearing assembly, while the lip 317 rides on the surface 313 and wards off dirt, water and other foreign matter from outside, such as particles worn off from brake linings and brake drums.

Figure 15:
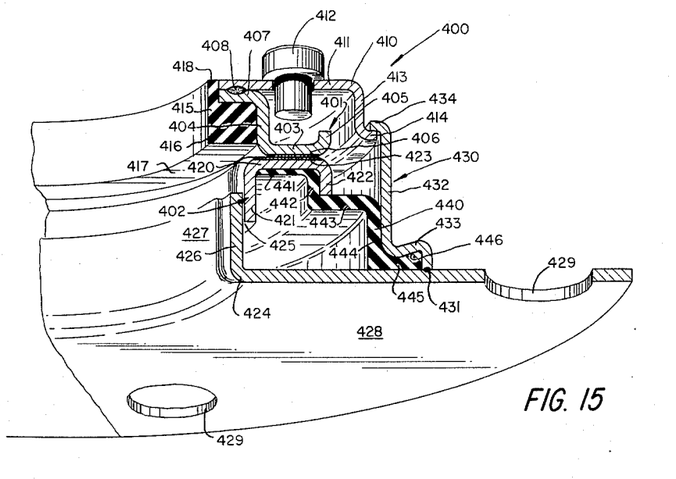
FIG. 15 is a fragmentary view in perspective and partly in section of another modified form of the invention comprising another unitized face seal shown in its preinstallation position.

*The seal 400 of FIGS. 15 and 16*

The seal 400 is like the seals 20, 100, 200 and 300 in that it has a pair of face sealing elements 401 and 402 both made from sheet metal. The element 401 has a radial web 403 extending between inner and outer axial flanges 404 and 405, and provided with a ceramic sealing face 406. The radially inner flange 404 terminates in a radially inwardly extending flange 407 which is secured as by spot welds 408 to a case 410. The case 410 has a radial flange 411 from which torque-locking pins 412 extend, and also has an axial flange 413 and a radially outturned terminal flange 414. An elastomeric body 415 provides an inner cylindrical periphery 416 and end faces 417 and 418.

The element 402 comprises a radial web 420 which lies between axially extending flanges 421 and 422 and is provided with a ceramic face 423. The flange 421 is torque-locked to a case 424 by indentations 425 and 426. The case 424 has an axially extending flange 427 and a radial flange 428 with perforations 429 through which bolts or other fastening members may be applied.

The case 424 is secured to a case member 430 as by projection welds 431. The case 430 extends generally axially along a cylindrical wall 432 and has a step portion 433 adjacent its base. At its opposite end a radialy inturned portion 434 extends inward to be engageable with the flange 414 of the case 410 for unitizing the seal, the portion 434 being turned over after the face seal 400 is assembled.

A stepped rubber bellows member 440 is provided at one end with a radial flange 441 sealing against the back side of the web 420. An axially extending portion 442 engages the inside surface of the flange 422 and joins the portion 441 to a second radially extending portion 443. A second axially extending portion 444 joins the portion 443 to a base portion 445 which is clamped into a pocket 446 provided by the step portion 433 of the case 430 and the flange 428 of the case 424. Guide button 447 in the bellows flange 441 (Fig. 16) cooperates with a plurality of dimples 448 on the flange 428 to retain each of a series of coil springs 450 that force the sealing faces 406 and 423 together.

In installation the flange 428 is bolted by bolts 460 to a bearing retainer 461, while the lock pins 412 engage openings 463 in a flange 464. Oil contained adjacent bearings 465 is therefore retained by the faces 406 and 423 and by the bellows 440 and elastomeric shaft gasket 415.

To those skilled in the art to which this invention relates, many additional changes in construction and widely differing embodiments of the invention will suggest themselves without departing from the spirit and scope of the invention as defined in the claims.

What is claimed is:

1. A unitized face seal comprising a first sheet metal ring having a radial flange reinforced by an axially extending portion, said radial flange have a face opposite said axially extending portion with a coated flat face; a second sheet metal ring having a radial flange reinforced by an axially extending flange, said radial flange having a face like that of said first ring in sealing contact with said first face; an annular metal case having a cylindrical portion with radially extending portions at each end, one spaced from said second ring radial flange on the side opposite said second face, the other spaced from said first ring's radial flange on the side opposite said first flange, thereby preventing withdrawal of said sheet metal rings from said case, one said ring and said case's cylindrical portion and one of its radial flanges defining an annular space; means in said space sealing between the latter said ring and said case while permitting relative axial movement; and an annular finger spring in said space having a base bearing on one of one said ring and said case and a series of fingers bearing against the other of said one ring and said case urging said faces toward each other.

2. A unitized face seal comprising a first sheet metal ring having a radial flange with one side coated and surfaced to provide a first sealing face and backed up by an axial flange; a second sheet metal ring having a radial flange with one side coated and surfaced to provide a second sealing face in sealing contact with said first face, and reinforced by an axial flange extending in the opposite direction from the axial flange of said first ring; a rigid annular sheet metal case splined to said second ring's axial flange against relative rotation and for relative axial movement, said case having a cylindrical portion and a radially extending portion at each end preventing withdrawal of said rings from said case, said second ring radial and axial flanges and said case's cylindrical portion and first radial flange defining an annular space; an O-ring in said space sealing between said second ring and said cylindrical portion; a sheet metal O-ring retainer ring enclosing two sides of said O-ring so that said O-ring is confined between it, said cylindrical portion, and the back of the radial flange of said second ring; and spring means urging said O-ring retainer ring against said second ring's radial flange and said second face against said first face.

3. A unitiled face seal comprising a first sheet metal ring having a radial flange with one face coated with an abrasion-resistant coating providing a substantially flat first sealing face and backed up by an axially extending flange; an elastomeric ring bonded to one side of said axial flange and to said radial flange on the side opposite said first face, said elastomeric ring providing a cylindrical periphery; a second sheet metal ring having a radial flange with one face coated with an abrasion-resistant coating providing a substantially flat second sealing face in sealing contact with said first sealing face and backed up by an axially extending flange; an annular metal case having a cylindrical portion and a first radially extending portion parallel to and spaced from said second ring radial flange on the side opposite said second face, said case first flange being splined to said second ring's axial flange against relative rotation and for relative axial movement, said case also having a second radially extending portion at the opposite end of said cylindrical portion spaced from said first ring's radial flange on the side opposite said first flange and preventing withdrawal of said first ring from said case, said second ring radial and axial flanges and said case's cylindrical portion and first radial flange defining an annular space; an O-ring in said space sealing between said second ring and said cylindrical portion; an O-ring retainer ring having two radial flanges connected stepwise by an axial flange, one of its said radial flanges having one face against the back of said second ring's radial flange so that said O-ring is confined between the other radial flange of said retainer ring, said axial flange, said cylindrical portion, and the back of the radial flange of said second ring; and a finger spring having a base abutting said first radially extending portion of said case and a series of fingers urging the first mentioned radial flange of said O-ring retainer ring against said second ring's radial flange and thereby urging said second face against said first face.

4. A unitized face seal comprising a first sheet metal ring having a radial flange coated with abrasion-resistant material providing a substantially flat sealing face and backed up by an axial flange at its outer periphery; a second sheet metal ring having a radial flange coated with abrasion-resistant material providing a substantially flat second sealing face in sealing contact with said first face and having an axial flange extending away from second face from the radially outer periphery of said radial flange of said second ring; a rigid annular metal case splined to said second ring against relative rotation and for relative axial movement and having a cylindrical portion of smaller diameter than either of said metal rings with a radially outwardly extending flange at each end, one parallel to and spaced from said second ring radial flange on the opposite side from said second face, the other being spaced from said first ring's radial flange on the opposite side from said first flange and preventing withdrawal of said first and second rings from said case.

5. The seal of claim 4 having an O-ring in said space sealing between said second ring and the outer surface of said cylindrical portion; an O-ring retainer ring confining said O-ring between itself and said outer surface, and the back of the radial flange of said second ring; and spring means between a radial flange of said case and of said O-ring retainer ring urging it against said second ring's radial flange and thereby urging said second face against said first face in sealing engagement therewith.

6. A unitized face seal comprising a first pressed steel ring formed to provide a radial flange coated with an abrasion-resistant material providing a substantially flat first sealing face and backed up by an axial flange at its radially outer periphery; a second pressed steel ring having a radial flange coated with an abrasion-resistant material providing a substantially flat second sealing face in sealing contact with said first face and having an axial flange extending away from said second face from the radially outer periphery of said radial flange of said second ring; an annular metal case having a cylindrical portion of smaller diameter than either of said metal rings and having a first radially outwardly extending flange parallel to and spaced from said second ring radial flange on the opposite side from said second face, said case first flange being splined to said second ring's axial flange against relative rotation and for relative axial movement, said case also having a radially out-turned second flange at the opposite end of said cylindrical portion beyond said first ring's radial flange on the opposite side from said first face and engageable with said first ring's radial flange to prevent withdrawal of said first and second rings from said case, said second ring radial and axial flanges and said case's cylindrical portion and first radial flange enclosing an annular space of generally rectangular cross-section; an O-ring in said space sealing between said second ring and the outer surface of said cylindrical portion; an O-ring retainer ring confining said O-ring between itself, said outer surface and the back of the radial flange of said second ring; and spring means between said first radial flange of said case and said O-ring retainer ring urging the latter against said second ring's radial flange and thereby urging said second face against said first face in sealing engagement therewith.

7. The seal of claim 6 wherein said spring is an annular finger spring.

8. A unitized face seal comprising a first pressed steel ring having a radial flange coated with an abrasion-resistant material providing a substantially flat first sealing face and backed up by an axial flange at its radially outer periphery; an elastomeric ring bonded to the radially outer side of said axial flange and providing a cylindrical outer periphery for said face seal; a second pressed steel ring having a radial flange coated with an abrasion-resistant material providing a substantially flat second sealing face in sealing contact with said first face, and having an axial flange extending away from said second face from the radially outer periphery of said radial flange of said second ring; an annular metal case having a cylindrical portion of smaller diameter than either of said metal rings, and having a first radially outwardly extending flange parallel to and spaced from said second ring radial flange on the opposite side from said second face, said case first flange being splined to said second ring's axial flange against relative rotation and for relative axial movement, said case also having a radially out-turned second flange at the opposite end of said cylindrical portion beyond said first ring's radial flange on the opposite side from said first face and engageable with said first ring's radial flange to prevent withdrawal of said first and second rings from said case, said second ring radial and axial flanges and said case's cylindrical portion and first radial flange enclosing an annular space of generally rectangular cross-section; an elastomeric member bonded to the inner periphery of said case cylindrical portion to provide an inner cylindrical periphery for said seal and to said first radial flange on the side further away from said second face, to provide a radially extending resilient thrust face; an O-ring in said space sealing between said second ring and the outer surface of said cylindrical portion; an O-ring retainer ring confining said O-ring between itself and said outer surface and the back of the radial flange of said second ring; and spring means between said first radial flange of said case and said O-ring retainer ring urging the latter against said second ring's radial flange and thereby urging said second face against said first face in sealing engagement therewith.

9. A unitized face seal comprising a first pressed steel ring having a radial flange, one side of which has an abrasion-resistant coating providing a substantially flat first sealing face and backed up by an axial flange at its radially outer periphery; an elastomeric ring bonded to the radially outer side of said axial flange and providing a cylindrical outer periphery for said face seal; a second pressed steel ring having a radial flange, one side of which has an abrasion-resistant coating providing a substantially flat second sealing face in sealing contact with said first face, and having an axial flange extending away from said second face from the radially outer periphery of said radial flange of said second ring; an annular metal case having a cylindrical portion of smaller diameter than either of said metal rings and having a first radially outwardly extending flange parallel to and spaced from the radial flange of said second ring on the opposite side thereof from said second face, the first flange of said case being splined to the axial flange of said second ring against relative rotation and for relative axial movement, said case also having a radially out-turned second flange at the opposite end of said cylindrical portion beyond the radial flange of said first ring and on the opposite side thereof from said first face and engageable with said radial flange of said first ring to prevent withdrawal of said first and second rings from said case, said radial and axial flanges of said second ring and said cylindrical portion and first radical flange of said case enclosing an annular space of generally rectangular cross-section; an elastomeric annular member bonded to the inner periphery of said cylindrical portion to provide an inner cylindrical periphery for said seal and bonded to said first radial flange on the side further away from said second face to provide a radially extending resilient thrust face; an elastomeric O-ring in said space sealing between said second ring and the outer surface of said cylindrical portion; an O-ring retainer ring having inner and outer radial flnages connected by an axial web, the outer radial flange having one face against the back of said radial flange of said second ring so that said O-ring is confined between said inner radial flange, said axial flange, said outer surface, and the back of the radial flange of said second ring; and an annular finger spring having a base ring abutting said first radial flange of said case and a series of fingers urging said outer flange of said O-ring retainer ring against said radial flange of said second ring and thereby urging said second face against said first face in sealing engagement therewith.

10. A unitizes face seal comprising a first sheet metal ring having a radial flange coated with abrasion-resistant material providing a substantially flat sealing face and backed up by a shot-gun type case at its inner periphery and an axial flange; a second sheet-metal ring having a second sealing face similar to said first face and in sealing contact with said first face, and having an axial flange extending away therefrom from the radially inner periphery of said radial flange of said second ring; a rigid annular metal case having an outer, stepped cylindrical portion of larger diameter than either of said metal rings, a radially inwardly extending web parallel to and spaced from said radial flange of said second ring on the opposite side from said second face, and an inner cylindrical portion splined to said axial flange of said second ring against relative rotation and for relative axial movement, said outer stepped portion terminating in a radially inturned edge, said radial and axial flanges of said second ring and said cylindrical portions and web of said case enclosing an annular space; an O-ring in said space sealing between said radial flange of said second ring and the radially inner surface of said outer cylindrical portion; an O-ring retainer ring confining said O-ring between said retainer ring, said radially inner surface and the back of said radial flange of said second ring; spring means urging said O-ring retainer ring against said radial flange of said second ring and thereby urging said second face against said first face; and a shaft seal held by said inturned edge in rotary sealing relation with the radially outer surface of said axial flange of said first ring and having a case element extending radially inwardly beyond the radially outer periphery of said first ring so as to prevent withdrawal of said sheet metal rings from said case.

11. A unitized face seal comprising a first sheet metal ring having a radial flange lapped and coated to provide a first sealing face and backed up by a shotgun-case corner at its inner periphery and an axial flange; a rubber ring bonded to said axial flange and said corner on the radially inner side; a metal member L-shaped in cross-section having a cylindrical portion bonded to an inner cylindrical wall of said rubber ring and providing the inner cylindrical periphery for said face seal, said metal member having a radially outwardly extending flange extending beyond the end of said axial flange of said first ring; a second sheet metal ring having a radial flange lapped and coated to provide a second sealing face in sealing contact with said first face, and having an axial flange extending away therefrom from the radially inner periphery of said radial flange of said second ring, the radially outer periphery of said second face being unsupported; a rigid annular metal case having an outer, outwardly stepped, cylindrical portion of larger diameter than either of said metal rings, a radially inwardly extending web parallel to and spaced from said radial flange of said second ring on the opposite side from said face, and an inner cylindrical portion splined to said axial flange of said second ring against relative rotation and for relative axial movement, said outer cylindrical portion having a smaller diameter portion nearer said web and a larger diameter portion further from said web terminating in a radially inturned edge; a cylindrical block of rubber bonded to the radially outer surface of said smaller diameter portion and extending radially beyond said larger diameter portion, its outer periphery being the cylindrical outer periphery of said seal; a shaft seal held in said larger diameter portion against its radially inner wall by said inturned edge and said step in rotary sealing relation with the radially outer surface of said axial flange of said first ring and preventing withdrawal of said sheet metal rings from said case, said radial and axial flanges of said second ring and said smaller diameter cylindrical portion and web of said case enclosing an annular space of generally rectangular cross-section; an O-ring in said space sealing between said second ring and the radially inner surface of said smaller diameter cylindrical portion; an O-ring retainer ring having inner and outer radial flanges connected by an axial web, the inner radial flange having one face against the back of said radial flange of said second ring so that said O-ring is confined between said outer radial flange, said axial flange, said inner surface, and the back of the radial flange of said second ring; and a finger spring having a base abutting said web of said case and a series of fingers urging said inner radial flange of said O-retainer ring against said radial flange of said second ring and thereby urging said second face against said first face.

12. A unitized face seal comprising a first sheet metal ring having a radial flange ceramic-coated and lapped to provide a first sealing face and backed up by a shotgun-case corner on its inner periphery and an axial flange; a rubber ring bonded to the radially inner surface of said axial flange; said rubber ring providing the inner cylindrical periphery for said face seal; a second sheet metal ring having a radial flange ceramic-coated and lapped to provide a second sealing face in sealing contact with said first face, and having an axial flange extending away from said face on the radially inner periphery of said radial flange of said second ring, the radially outer periphery of said second face being unsupported; a rigid annular metal case having a stepped, radially-outer, cylindrical will with an outer portion of larger diameter than either of said rings connected by a step to an inner portion that terminates in a first radially extending end wall, a second radially extending end wall at the end of said outer portion parallel to and spaced from said radial flange of said second ring on the opposite side from said second face, and an inner cylindrical flange extending axially from said second end wall and splined to said axial flange of said second ring against relative rotation and for relative axial movement, said first end wall being spaced from said radial flange of said first ring on the side opposite said first flange and preventing withdrawal of said first ring from said case, said second ring and said outer portion of said cylindrical flange, and second end wall of said case defining an annular space of generally rectangular cross-section; a shaft seal supported by said case adjacent said first end wall in rotary sealing engagement with said axial flange of said first ring; an O-ring in said space sealing against the inner surface of said outer portion of said cylindrical wall; an O-ring retainer ring having inner and outer radial flanges connected by an axial web, the inner radial flange having one face against the back of said radial flange of said second ring so that said O-ring is confined between said outer radial flange, said axial flange, said inner surface, and the back of the radial flange of said second ring; and a finger spring having a base abutting said second end wall of said case and a series of fingers urging said inner flange of said O-ring retainer ring against said radial flange of said second ring and thereby urging said second face against said first face.

13. A unitized face seal comprising a first sheet metal ring having a radial flange reinforced by an axially extending flange, a second sheet metal ring having a radial flange reinforced by an axially extending flange, the side of each said radial flange opposite to its said reinforcing axially extending flange being coated with a hard material bonded to said flange and surfaced to provide a sealing face, said sealing faces being in contact with each other, said axially extending flanges extending in opposite axial directions, and an annular metal case having a cylindrical portion with radially extending portions at each end on opposite sides of said radial flanges and preventing withdrawal of said rings from said case, one said ring and said case's cylindrical portion and one radial flange on the side opposite its said sealing face defining an annular space, and sealing means in said space sealing between said one ring and said case while enabling axial movement therebetween, said sealing means in said space comprising an O-ring, an O-ring retainer ring confining said O-ring between itself and the closest said radial flange, and spring means between said retainer ring and one of said radially extending portions of said case, for urging said retainer ring against the adjacent said radial flange.

References Cited by the Examiner

UNITED STATES PATENTS

| | | | |
|---|---|---|---|
| 1,862,887 | 6/1932 | Durdin | 277—92 X |
| 2,161,672 | 6/1939 | Gilman | 277—87 X |
| 2,494,887 | 1/1950 | Lenhart | 277—82 X |
| 2,879,093 | 3/1959 | Dolhun | 277—41 |
| 2,905,512 | 9/1959 | Anderson. | |
| 2,944,843 | 7/1960 | Colby | 277—81 X |
| 2,985,475 | 5/1961 | Peickii et al. | 277—85 X |

FOREIGN PATENTS 129,465    8/1932    Austria.

LAVERNE D. GEIGER, *Primary Examiner.*

WALTER A. SCHEEL, *Examiner.*

UNITED STATES PATENT OFFICE
CERTIFICATE OF CORRECTION

Patent No. 3,231,284                          January 25, 1966

Vasalie L. Peickii et al.

It is hereby certified that error appears in the above numbered patent requiring correction and that the said Letters Patent should read as corrected below.

Column 1, line 28, for "utilized" read -- unitized --; column 4, line 70, for "elemet" read -- element --; line 71, for "flage" read -- flange --; column 5, line 56, for "50" read -- 58 --; column 8, line 19, strike out "56-----Nickel base alloy (similar to TS-16C)." and insert the same above "Colmonoy powders:" in line 18, same column 8; line 59, for "particels" read -- particles --; column 9, line 7, for "$(_2{}^2-r_1{}^2)$" read -- $(r_2^2-r_1^2)$ --; line 10, for "pressure at" read -- pressure at the --; line 34, for that portion of the equation reading "$r^2{}_1)$" read -- $r_1^2)$ --; column 10, line 14, for "3500" read -- 3600 --; column 12, lines 27 to 29, for that portion of the equation reading "$\overline{35}$" read -- $\overline{36}$ --; lines 43 to 45, for that portion of the equation reading "35EI" read -- 36EI --; column 13, line 46, for "sheet case" read -- sheet metal case --; column 15, line 20, after "made" insert -- of --; line 64, for "radialy" read -- radially --; column 16, line 62, for "unitiled" read -- unitized --; column 19, line 6, for "radical" read -- radial --; line 15, for "flnages" read -- flanges --; line 26, for "unitizes" read -- unitized --; column 20, line 33, for "O-retainer ring" read -- O-ring retainer ring --; column 20, line 50, for "will" read -- wall --.

Signed and sealed this 20th day of December 1966.

(SEAL)
Attest:

ERNEST W. SWIDER                          EDWARD J. BRENNER
Attesting Officer                        Commissioner of Patents